United States Patent
Hudson et al.

(10) Patent No.: US 10,368,289 B2
(45) Date of Patent: Jul. 30, 2019

(54) APPARATUS AND METHOD FOR COMMUNICATIONS MANAGEMENT

(71) Applicant: BAE SYSTEMS PLC, London (GB)

(72) Inventors: Peter Noble Hudson, Preston (GB); Rania Hamdi Eissa, Preston (GB); Roderick Buchanan, Preston (GB)

(73) Assignee: BAE Systems plc, London (GB)

( * ) Notice: Subject to any disclaimer, the term of this patent is extended or adjusted under 35 U.S.C. 154(b) by 44 days.

(21) Appl. No.: 15/747,682

(22) PCT Filed: Aug. 10, 2016

(86) PCT No.: PCT/GB2016/052480
§ 371 (c)(1),
(2) Date: Jan. 25, 2018

(87) PCT Pub. No.: WO2017/025741
PCT Pub. Date: Feb. 16, 2017

(65) Prior Publication Data
US 2018/0220352 A1    Aug. 2, 2018

(30) Foreign Application Priority Data

Aug. 13, 2015 (GB) .................................. 1514462.9
Sep. 7, 2015 (EP) .................................... 15184044

(51) Int. Cl.
*H04W 40/18* (2009.01)
*H04B 7/185* (2006.01)
(Continued)

(52) U.S. Cl.
CPC .......... *H04W 40/18* (2013.01); *G08G 5/0013* (2013.01); *G08G 5/0039* (2013.01);
(Continued)

(58) Field of Classification Search
CPC ..................................................... H04W 40/18
See application file for complete search history.

(56) References Cited

U.S. PATENT DOCUMENTS 2,062,003 A    11/1936 Hammond, Jr.
4,100,472 A    7/1978 Mobley
(Continued)

FOREIGN PATENT DOCUMENTS

EP    0481171 A2    4/1992
EP    0532383 A1    3/1993
(Continued)

OTHER PUBLICATIONS

International Preliminary Report on Patentability of International Application No. PCT/GB2016/052371, md Feb. 22, 2018, 10 pages.
(Continued)

*Primary Examiner* — Ankur Jain
(74) *Attorney, Agent, or Firm* — Maine Cernota & Rardin

(57) ABSTRACT

Apparatus for generating a connectivity map in respect of a communications system of a moving platform, said communications system comprising at least one platform application and being configured to effect wireless data communication between said platform and another node by means of one of a plurality of supported communications links in accordance with a communications plan, wherein said apparatus is configured to: —identify (700) a message or set of messages required to be transmitted from or received by said moving platform; —generate a connectivity map comprising a plurality of connectivity metrics by, for each of a plurality of different specified attitudes or orientations derived from one or more predicted trajectories of said moving platform: —identifying available transmitters for wireless transmission of said message or set of messages and/or identify available receivers for wireless reception of said message or set of messages; —for each identified transmitter, determin-
(Continued)

ing (702) a transmitter metric and/or for each identified receiver, determining (702) a receiver metric; and —defining (704) a connectivity metric, based on said transmitter metrics and/or receiver metrics for said respective specified attitude or orientation, said connectivity metric being representative of a quality of a respective associated communications link for effecting transmission or reception by said platform of said message or set of messages in respect of said respective specified attitude or orientation of said moving platform.

14 Claims, 5 Drawing Sheets

(51) Int. Cl.
    *G08G 5/00*      (2006.01)
    *H04W 40/12*     (2009.01)
    *H04W 40/24*     (2009.01)

(52) U.S. Cl.
    CPC ......... *G08G 5/0052* (2013.01); *G08G 5/0056* (2013.01); *G08G 5/0069* (2013.01); *G08G 5/0091* (2013.01); *H04B 7/18506* (2013.01); *H04W 40/12* (2013.01); *H04W 40/248* (2013.01)

(56) References Cited

U.S. PATENT DOCUMENTS

| | | | |
|---|---|---|---|
| 6,026,097 A * | 2/2000 | Voois | H04N 7/52 370/468 |
| 6,115,580 A | 9/2000 | Chuprun et al. | |
| 7,072,977 B1 | 7/2006 | Bernard et al. | |
| 7,151,749 B2 * | 12/2006 | Vega-Garcia | H04L 29/06 370/241.1 |
| 8,005,418 B2 * | 8/2011 | Walker | H04B 7/18519 455/3.01 |
| 8,554,264 B1 | 10/2013 | Gibbons et al. | |
| 2002/0142773 A1 | 10/2002 | Rudrapatna et al. | |
| 2002/0164981 A1 | 11/2002 | Parkman | |
| 2003/0073406 A1 | 4/2003 | Benjamin | |
| 2003/0114195 A1 * | 6/2003 | Chitrapu | H01Q 1/246 455/562.1 |
| 2005/0202827 A1 | 9/2005 | Demarco et al. | |
| 2006/0030350 A1 | 2/2006 | Mitchell | |
| 2006/0168592 A1 | 7/2006 | Andrews et al. | |
| 2007/0064604 A1 | 3/2007 | Chen | |
| 2007/0168090 A1 | 7/2007 | Demarco et al. | |
| 2007/0258445 A1 * | 11/2007 | Smith | H04L 47/10 370/389 |
| 2007/0258486 A1 | 11/2007 | Smith | |
| 2007/0291647 A1 * | 12/2007 | Smith | H04L 49/90 370/237 |
| 2007/0291767 A1 * | 12/2007 | Smith | H04L 47/10 370/395.21 |
| 2007/0291768 A1 * | 12/2007 | Galluscio | H04L 47/10 370/395.21 |
| 2007/0291780 A1 * | 12/2007 | Smith | H04L 47/10 370/411 |
| 2007/0297416 A1 * | 12/2007 | Boley | H04L 47/10 370/395.21 |
| 2008/0026767 A1 * | 1/2008 | Krstulich | H04L 63/104 455/452.2 |
| 2008/0204279 A1 | 8/2008 | Bourgault | |
| 2009/0079631 A1 | 3/2009 | Hurst | |
| 2009/0185617 A1 | 7/2009 | Houghton et al. | |
| 2009/0326735 A1 | 12/2009 | Wood | |
| 2010/0057278 A1 * | 3/2010 | Lee | G05D 1/0676 701/16 |
| 2010/0094485 A1 | 4/2010 | Verlut et al. | |
| 2010/0220648 A1 * | 9/2010 | Persson | H04L 47/10 370/328 |
| 2010/0278086 A1 * | 11/2010 | Pochiraju | H04W 28/20 370/310 |
| 2010/0323715 A1 | 12/2010 | Winters | |
| 2011/0090835 A1 * | 4/2011 | Furukawa | H04W 40/06 370/312 |
| 2011/0255506 A1 * | 10/2011 | Toth | H04B 7/18506 370/331 |
| 2012/0078453 A1 | 3/2012 | Daum et al. | |
| 2012/0257657 A1 | 10/2012 | Subrahmanya et al. | |
| 2012/0268319 A1 | 10/2012 | Mitchell | |
| 2013/0041529 A1 * | 2/2013 | He | G08G 5/0021 701/17 |
| 2013/0095822 A1 | 4/2013 | Swardh | |
| 2013/0324070 A1 | 12/2013 | Bennett et al. | |
| 2014/0014787 A1 | 1/2014 | Chen | |
| 2014/0075506 A1 | 3/2014 | Davis | |
| 2014/0105054 A1 | 4/2014 | Saegrov | |
| 2014/0142787 A1 | 5/2014 | Tillotson | |
| 2014/0218239 A1 | 8/2014 | Sharawi et al. | |
| 2014/0226584 A1 | 8/2014 | Cullen et al. | |
| 2014/0274180 A1 * | 9/2014 | DuBois | H04W 72/04 455/509 |
| 2014/0323038 A1 | 10/2014 | Hubbell et al. | |
| 2015/0043337 A1 * | 2/2015 | Kanamarlapudi | H04W 72/1252 370/230 |
| 2015/0102953 A1 | 4/2015 | Stayton | |
| 2015/0120087 A1 | 4/2015 | Duan | |
| 2015/0131513 A1 * | 5/2015 | Lauer | H04W 4/06 370/312 |
| 2015/0210387 A1 | 7/2015 | Ling | |
| 2015/0229376 A1 * | 8/2015 | Kikuchi | H01Q 3/24 342/367 |
| 2017/0034277 A1 * | 2/2017 | Jackson | H04L 67/12 |
| 2017/0229023 A1 * | 8/2017 | Connor | H04W 84/18 |
| 2017/0283038 A1 | 10/2017 | Lin | |

FOREIGN PATENT DOCUMENTS

| | | |
|---|---|---|
| EP | 1519507 A2 | 3/2005 |
| EP | 1630978 A2 | 3/2006 |
| EP | 2228868 A1 | 9/2010 |
| EP | 2378676 A1 | 10/2011 |
| EP | 2450862 A1 | 5/2012 |
| EP | 2469291 A1 | 6/2012 |
| EP | 2779480 A2 | 9/2014 |
| EP | 2822187 A1 | 1/2015 |
| EP | 2869479 A1 | 5/2015 |
| EP | 2933931 A2 | 10/2015 |
| GB | 2493779 A | 2/2013 |
| JP | 2001153596 A | 6/2001 |
| JP | 2010171496 A | 8/2010 |
| TW | 201321916 A | 6/2013 |
| WO | 2006130272 A2 | 12/2006 |
| WO | 2007021411 A2 | 2/2007 |
| WO | 2007110607 A1 | 10/2007 |
| WO | 2010147986 A1 | 12/2010 |
| WO | 2011075869 A1 | 6/2011 |
| WO | 2012145570 A1 | 10/2012 |
| WO | 2015117284 A1 | 8/2015 |

OTHER PUBLICATIONS

International Preliminary Report on Patentability of International Application No. PCT/GB2016/052374, md Feb. 22, 2018, 8 pages.
International Preliminary Report on Patentability of International Application No. PCT/GB2016/052484, dated Feb. 22, 2018, 7 pages.
International Preliminary Report on Patentability of International Application No. PCT/GB2016/052480, dated Feb. 22, 2018, 8 pages.
International Preliminary Report on Patentability of International Application No. PCT/GB2016/052481, dated Feb. 22, 2018, 8 pages.
International Preliminary Report on Patentability of International Application No. PCT/GB2016/052401, dated Feb. 22, 2018, 8 pages.

(56) References Cited

OTHER PUBLICATIONS

International Preliminary Report on Patentability of International Application No. PCT/GB2016/052400, dated Feb. 22, 2018, 7 pages.
International Preliminary Report on Patentability of International Application No. PCT/GB2016/052378, dated Feb. 22, 2018, 7 pages.
International Preliminary Report on Patentability of International Application No. PCT/GB2016/052483, dated Feb. 22, 2018, 9 pages.
International Search Report and Written Opinion of International Application No. PCT/GB2016/052371, dated Oct. 26, 2016, 14 pages.
Great Britain Search Report under Section 17 of Great Britain Application No. GB1514451.2, dated Feb. 15, 2016, 3 pages.
Extended European Search Report of European Application No. EP15183514, dated Mar. 2, 2016, 10 pages.
International Search Report and Written Opinion of International Application No. PCT/GB2016/052374, dated Oct. 13, 2016, 12 pages.
Great Britain Search Report under Section 17 of Great Britain Application No. GB1514452, dated Jan. 26, 2016, 4 pages.
Extended European Search Report of European Application No. EP15183519, dated Mar. 3, 2016, 8 pages.
International Search Report and Written Opinion of International Application No. PCT/GB2016/052378 dated Oct. 24, 2016, 11 pages.
Great Britain Search Report under Section 17 of Great Britain Application No. GB1514454.6, dated Jan. 28, 2016, 3 pages.
European Search Report of European Application No. EP15183517, dated Mar. 1, 2016, 8 pages.
International Search Report and Written Opinion of International Application No. PCT/GB2016/052379, dated Oct. 18, 2016, 10 pages.
Great Britain Search Report under Section 17 of Great Britain Application No. GB1514455.3, dated Mar. 18, 2016, 4 pages.
European Search Report of European Application No. EP15183723, dated Mar. 3, 2016, 6 pages.
International Search Report and Written Opinion of International Application No. PCT/GB2016/052400, dated Oct. 18, 2016, 12 pages.
Great Britain Search Report under Section 17 of Great Britain Application No. GB1514457.9, dated Mar. 18, 2016, 3 page.
European Search Report of European Application No. EP15183720, dated Mar. 4, 2016, 8 pages.

Chen-Mou Cheng et al: "Transmit Antenna Selection Based on Link-layer Channel Probing", World of Wireless, Mobile and Multimedia Networks, 2007. WOWMUM 2007. IEEE International Symposium on A, IEEE, PI, Jun. 1, 2001, pp. 1-6 XP031149144.
International Search Report and Written Opinion of International Application No. PCT/GB2016/052401, dated Oct. 14, 2016, 12 pages.
Great Britain Search Report under Section 17 of Great Britain Application No. GB1514459.5, dated Jan. 28, 2016, 4 pages.
European Search Report of European Application No. EP15183731, dated Mar. 9, 2016, 8 pages.
International Search Report and Written Opinion of International Application No. PCT/GB2016/052481, dated Nov. 2, 2016, 12 pages.
Great Britain Search Report under Section 17 of Great Britain Application No. GB1514460.3, dated Jan. 27, 2016, 3 pages.
Great Britain Search Report under Section 17 of Great Britain Application No. GB1613746.5, dated Jan. 30, 2017, 5 pages.
European Search Report of European Application No. EP15184038, dated Mar. 2, 2016, 9 pages.
International Search Report and Written Opinion of International Application No. PCT/GB2016/052483, dated Oct. 28, 2016, 13 pages.
Great Britain Search Report under Section 17 of Great Britain Application No. GB1514461.1, dated Jan. 29, 2016, 3 pages.
Great Britain Search Report under Section 17 of Great Britain Application No. GB1613747.3, dated Jan. 6, 2017, 5 pages.
European Search Report of European Application No. EP15184043, dated Mar. 7, 2016, 10 pages.
International Search Report and Written Opinion of International Application No. PCT/GB2016/052480, dated Oct. 28, 2016, 12 pages.
Great Britain Search Report under Section 17 of Great Britain Application No. GB1514462.9, dated Mar. 18, 2016, 3 pages.
European Search Report of European Application No. EP15184044, dated Mar. 10, 2016, 8 pages.
International Search Report and Written Opinion of International Application No. PCT/GB2016/052484, dated Oct. 18, 2016, 12 pages.
Great Britain Search Report under Section 17 of Great Britain Application No. GB1514465.2, dated Mar. 17, 2016, 3 pages.
European Search Report of European Application No. EP15184074, dated Mar. 4, 2016, 8 pages.
International Preliminary Report on Patentability of International Application No. PCT/GB2016/052379, md Feb. 22, 2018, 7 pages.

* cited by examiner

US 10,368,289 B2

APPARATUS AND METHOD FOR COMMUNICATIONS MANAGEMENT

RELATED APPLICATIONS

This application is a national phase application filed under 35 USC § 371 of PCT Application No. PCT/GB2016/052480 with an International filing date of Aug. 10, 2016 which claims priority of GB Patent Application 1514462.9 filed Aug. 13, 2015 and EP Patent Application 15184044.4 filed Sep. 7, 2015. Each of these applications is herein incorporated by reference in its entirety for all purposes.

This invention relates generally to an apparatus and method for communications management and information and, more particularly, but not necessarily exclusively, to an apparatus and method for use in the management of wireless communications resources between a moving platform and at least one recipient node.

There are many applications in which it is required to apply a level of management in respect of wireless data communications and the management of information, particularly between a moving platform and a remote recipient node, and maintain adequate communications therebetween for safe operation of the moving platform and mission success.

For example, in the case of aerial vehicles and, more particularly, unmanned aerial vehicles (UAVs), there is an ongoing and stringent requirement to maintain an adequate communication link between the aerial vehicle and a ground station, for example, and unexpected loss or degradation of such a communications link can be catastrophic.

A UAS is composed of three main parts, the unmanned air vehicle (UAV), unmanned control station (UCS) and support systems of the UAS (for pre-mission planning). A UAS Mission System may be composed of the following functional components/subsystems: Mission Management, Communications, Vehicle Health, Navigation System, Airspace Integration, Payload and Power Management. Multiple, different dynamic in-mission planners may reside in one or more of the above-mentioned functional components/subsystems. In a typical UAV, a dynamic route planner generates a new route, in real time, when there is a change in the operational environment, e.g. severe weather, pop-up threat, or a change of circumstances, e.g. an emergency, or a dynamic manoeuvre plan is generated to avoid an airborne obstacle. The aim is thus to maintain safety and the survivability of the aircraft by determining a feasible route and/or manoeuvre in real time, while avoiding pop-up, static and dynamic obstacles, for example.

However, the operational environment of moving platforms, at least in some applications, can be particularly challenging from a communications perspective. For example, a pilot (at a ground station) and an air vehicle may be communicating via SATCOM, when the on-board system detects an intruder and manoeuvres to avoid it. In doing so, in prior art systems, the air vehicle may cut off its link to the satellite and communications between the air vehicle and the pilot is lost. As a result, the pilot no longer has situational awareness of conditions relating to the UAV and its environment. Ideally, it is desired that communications between the UAV and the pilot is maintained regardless of the manoeuvre/orientation of the aircraft or any other unplanned event. In particular, therefore, it would be desirable to provide a method and system for generating a connectivity map that can be used by the dynamic planner, such as the route and manoeuvre planner, to generate a plan that safely manoeuvres the platform, while still maintaining connectivity with other platforms in the area, including the ground/control station, when unexpected events happen.

It is, therefore, an object of at least some aspects of the present invention to address at least one or more of these issues and, in accordance with a first aspect of the invention, there is provided apparatus for generating a connectivity map in respect of a communications system of a moving platform, said communications system comprising at least one platform application and being configured to effect wireless data communication between said platform and another node by means of one of a plurality of supported communications links in accordance with a communications plan, wherein said apparatus is configured to:

identify a message or set of messages required to be transmitted from or received by said moving platform; and generate a connectivity map comprising a plurality of connectivity metrics by, for each of a plurality of different specified attitudes or orientations derived from one or more predicted trajectories of said moving platform:

identifying available transmitters for wireless transmission of said message or set of messages and/or identify available receivers for wireless reception of said message or set of messages;

for each identified transmitter, determining a transmitter metric and/or for each identified receiver, determining a receiver metric; and defining a connectivity metric, based on said transmitter metrics and/or receiver metrics for said respective specified attitude or orientation, said connectivity metric being representative of a quality of a respective associated communications link for effecting transmission or reception by said platform of said message or set of messages in respect of said respective specified attitude or orientation of said moving platform.

In an exemplary embodiment, the moving platform may comprise an airborne vehicle, and said specified attitude or orientation comprises a specified heading and/or banking angle of said airborne vehicle.

Optionally, the apparatus may be configured to calculate, in respect of each identified transmitter, said transmitter metric for at least a portion of said predicted trajectory of said moving platform by:

obtaining a transmitter preference value and a transmitter availability value;

estimating a link quality or obtaining a measured link quality of the respective associated communications link using data obtained from one or more systems/subsystems of said moving platform; and calculating said transmitter metric using said transmitter preference, transmitter availability and estimated and/or measured link quality values.

Optionally, the apparatus may be configured to calculate, in respect of each identified receiver, said receiver metric for at least a portion of said predicted trajectory of said moving platform by:

obtaining a receiver preference value and a transmitter availability value;

estimating a link quality or obtaining a measured link quality of the respective associated communications link using data obtained from one or more systems/subsystems of said moving platform; and calculating said receiver metric using said receiver preference, transmitter availability and estimated and/or measured link quality values.

For each of said specified attitudes or orientations, a transmitter metric or receiver metric may be calculated in respect of each of a plurality of portions of at least one predicted trajectory of said moving platform. In this case, each said connectivity metric for a communications link may be defined using said respective transmitter metrics or receiver metrics determined for said plurality of portions of said predicted trajectory in respect thereof.

Optionally, the connectivity metric for a communications link may be equal to said respective transmitter/receiver metric, or a sum of a plurality of respective transmitter/receiver metrics, determined for a predicted trajectory of said moving platform.

Alternatively, the connectivity metric for a communications link may be defined as a binary value, integer values or non-integer values indicative of a quality of the respective communications link for transmitting/receiving said message or set of messages in respect of a specified attitude or orientation of said moving platform.

In an exemplary embodiment, the apparatus may be configured to identify a communications link having a highest transmitter/receiver metric, and define said connectivity metric based on said identified communications link.

Optionally, the apparatus may be configured to identify, for a specified attitude or orientation of said moving platform, more than one communications link having the best transmitter/receiver metrics, and define a plurality of said connectivity metrics based on each said communications link.

In some exemplary embodiments, a jointly optimised connectivity metric may be calculated for a plurality of messages or message sets.

The apparatus may be configured to:
identify a plurality of messages or sets of messages required to be transmitted from or received by said moving platform; and
generate a connectivity map comprising a plurality of connectivity metrics by, for each of a plurality of different specified attitudes or orientations derived from one or more predicted trajectories of said moving platform:
  identifying available transmitters for wireless transmission of said plurality of messages or sets of messages and/or identify available receivers for wireless reception of said plurality of messages or sets of messages;
  for each identified transmitter, determining a transmitter metric and/or for each identified receiver, determining a receiver metric; and
  for all of said plurality of messages or sets of messages, defining a combined connectivity metric, based on said transmitter metrics and/or receiver metrics for said respective specified attitude or orientation, said combined connectivity metric being representative of a quality of a respective associated communications link for effecting transmission or reception by said platform of said plurality of messages or sets of messages in respect of said respective specified attitude or orientation of said moving platform.

The apparatus may be configured to cause said connectivity map to be stored and/or transmitted to a dynamic route planner or dynamic obstacle avoidance planner of said moving platform.

In accordance with another aspect of the present invention, there is provided a management system for a moving platform comprising a plurality of systems and at least one platform application, a dynamic route planner configured to generate a route plan or a dynamic obstacle avoidance planner configured to generate a new heading plan in respect of said moving platform, a communications system said communications system comprising at least one platform application and being configured to effect wireless data communication between said platform and another node by means of one of a plurality of supported communications links in accordance with a communications plan, and apparatus substantially as described above, wherein said dynamic route planner or said dynamic obstacle avoidance planner is configured to use said connectivity map to generate a route plan or heading plan including an attitude/orientation of said mobile platform corresponding to a selected connectivity metric.

In accordance with yet another aspect of the present invention, there is provided a method for generating connectivity data in respect of a communications system of a moving platform, said communications system comprising at least one platform application and being configured to effect wireless data communication between said platform and another node by means of one of a plurality of supported communications links in accordance with a communications plan, wherein said method comprises:
identifying a message or set of messages required to be transmitted from or received by said moving platform; and
generating a connectivity map comprising a plurality of connectivity metrics by, for each of a plurality of different specified attitudes or orientations derived from one or more predicted trajectories of said moving platform:
  identifying available transmitters for wireless transmission of said message or set of messages and/or identify available receivers for wireless reception of said message or set of messages;
  for each identified transmitter, determining a transmitter metric and/or for each identified receiver, determining a receiver metric; and
  defining a connectivity metric, based on said transmitter metrics and/or receiver metrics for said respective specified attitude or orientation, said connectivity metric being representative of a quality of a respective associated communications link for effecting transmission or reception by said platform of said message or set of messages in respect of said respective specified attitude or orientation of said moving platform.

These and other aspects of the present invention will be apparent from the following specific description in which embodiments of the present invention are described, by way of examples only, and with reference to the accompanying drawings, in which.

Figure 6:
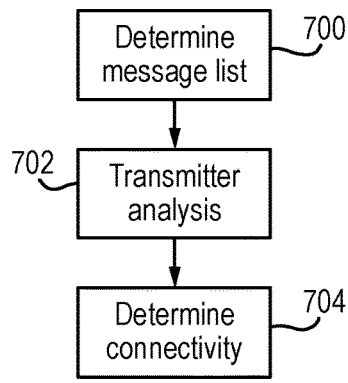
Figure 7:
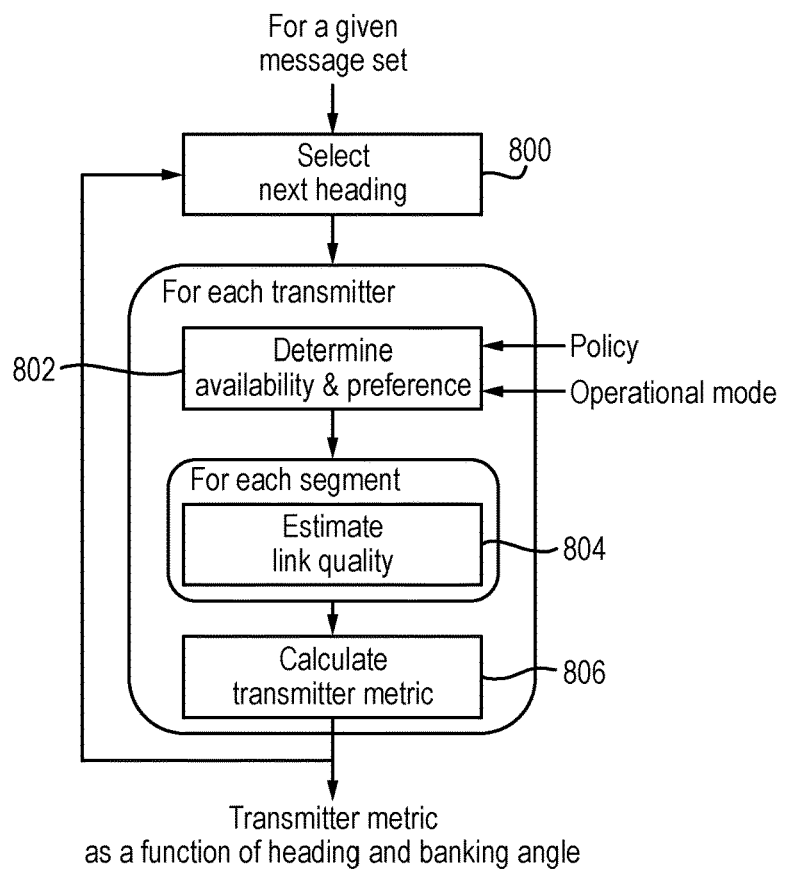

FIG. 6 is a flowchart illustrating the principal steps of a method, for use in an exemplary embodiment of the present invention, for determining a Connectivity Metric as a function of heading and banking angle; and FIG. 7 is a flowchart illustrating the principal steps of a method, for use in an exemplary embodiment of the present invention, for transmitter analysis as a function of predicted heading and banking angle.

Exemplary embodiments of the present invention provide apparatus for generating a so-called connectivity map in respect of a moving platform and its communication system, the connectivity map being intended for use by the dynamic route planner or dynamic manoeuvre planner with a view to maintaining adequate connectivity throughout a manoeuvre or change in route, in response to unplanned events. Traditionally, a dynamic route or manoeuvre plan has been generated without considering connectivity issues that may be affected by a manoeuvre or a change in route.

In contrast, in one exemplary aspect of the invention, it is envisaged that a connectivity map is generated in respect of a moving platform, wherein the connectivity map comprises a set of connectivity metrics. Each connectivity metric describes the ability of the platform to maintain communications as a result of a respective manoeuvre, as a function of predicted heading and banking angle (defined by the manoeuvre).

It is thus recognised herein, that during a planned flight, a node may need to dynamically change its course, in order to avoid an airborne obstacle, for example. The signal is lost or adversely affected by the change in heading because the aircraft antenna is pointing in an unfavourable direction or the quality of the signal in the new location is severely constrained (e.g. due to interferences/obstacles). A node needs to consider the impact on its ability to communicate when planning its next move. The above-mentioned connectivity map provides the dynamic planner (e.g. route, manoeuvre planner) with information to help the mobile node to intelligently move to a location while maintaining connectivity to a fixed and/or mobile node.

Figure 4:
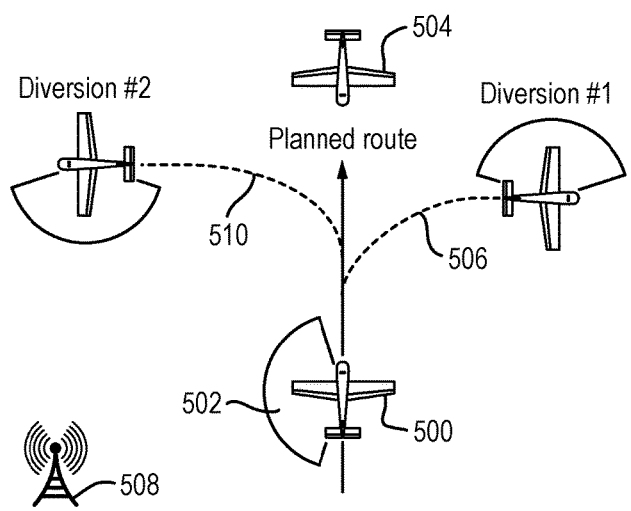
FIG. 4 is a schematic illustration of a moving platform together with two possible diversion routes in the event of an oncoming threat.

FIG. 4 depicts an aircraft 500 with a transmission antenna gain pattern 502 to the left of the aircraft. The aircraft performs a manoeuvre in order to avoid a head-on obstacle 504. Following diversion route #1 (506), the aircraft no longer has line-of-sight path with the recipient 508. However, if it follows diversion route #2 (510), the aircraft 500 can maintain its communication link with the recipient 508, which could be fixed or mobile. This information is then made available to the dynamic route planner or dynamic manoeuvre planner for consideration while planning.

The operational environment of a moving platform, in many different applications, comprises a plurality of nodes (e.g. fixed/mobile control station, manned and/or unmanned air vehicles) interacting with each other via different networks, exchanging, for example, Command and Control (C2), maintaining situational/environmental awareness, and cooperatively working together. In general, a node has multiple data links/radios to enable it to interact with other nodes via different networks, as required.

In the following description of the drawings, a communications management system including apparatus according to an exemplary embodiment of the invention will be described in relation to a UAV. However, it is to be understood that the present invention is not necessarily intended to be limited in this regard and, indeed, finds application in many other types of mobile vehicle and fixed infrastructure systems in which it is required to manage communications in an intelligent manner and, for the avoidance of doubt, this would include manned and unmanned road and sea-going vehicles, ground- and airborne-control based infrastructure, as well as manned aerial vehicles.

It will be appreciated by a person skilled in the art that the proposed invention may be employed equally effectively:
during an initial planning phase, i.e. pre-mission planning, wherein the proposed invention may be used during the route and/or communications planning phase; and
during mission execution.

Figure 1:
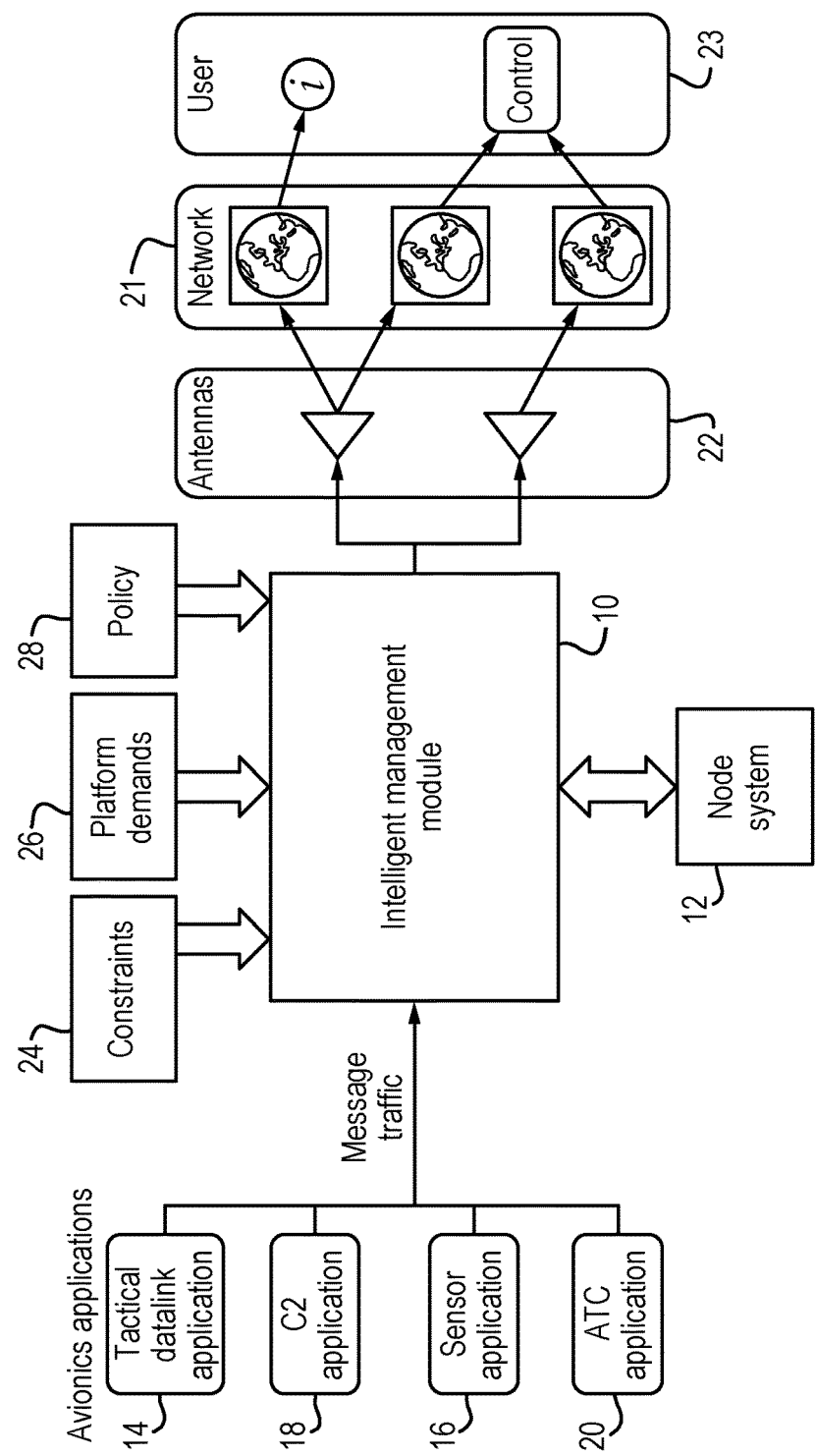
FIG. 1 is a schematic block diagram illustrating a moving platform system, including apparatus according to an exemplary embodiment of the present invention.

Referring to FIG. 1 of the drawings, an intelligent management module 10, including apparatus according to an exemplary embodiment of an aspect of the present invention, is illustrated schematically at the centre of a typical UAV. The UAV system comprises several subsystem/systems, including communications, navigation system, prognostics and health, etc. Thus, in the schematic diagram of FIG. 1, the intelligent communications management module 10 is depicted as being communicably coupled to other parts 12 of the vehicle. It can be seen from the diagram that two-way data communication is provided between the rest of the vehicle 12 and the intelligent management module 10. The node system 12 may comprise a plurality of subsystem/systems, possibly including, but not necessarily limited to, a prognostics and health system, a navigation system, a control authority, e.g. pilot or an on-board authority with executive decision functionality, a utilities management system, defensive aids system, data transfer and recording system, and an HMI (Human Machine Interface) system. Any and all of these functional components are configured to provide information, such as navigation data and detected threat, to the intelligent communications management module 10 for use in its decision making.

The intelligent communications management module 10 is also configured to receive data from a plurality of avionics applications. Such avionics applications may, for example, comprise civil and/or military applications, such as tactical datalink applications 14, sensor applications 16 (e.g. video, images, etc), mission management applications 18 (for example, command and control data), and platform management applications 20 (e.g. health of node). It will be appreciated that this is not a comprehensive list of typical or possible applications from which the intelligent communications management system may receive data and others will be apparent to a person skilled in the art, depending upon the specific application within which the present invention is to be employed.

The intelligent communications management module 10 is configured to manage multiple communications links (generally depicted in FIG. 1 as 'network' 21), which may include (but are not limited to) tactical data links, satellite links, free space optical links and other data links, as will be apparent to a person skilled in the art, and it may have different antenna types (depicted generally at 22) to manage including, but not limited to, omni-directional and directional antennas, fixed or beam-steerable antennas. The antennas may be shared between communications links/radios, or with sensor systems. In the example illustrated in FIG. 1, the communications from the platform antennas 22 are directed at an end user 23, for example, the remote pilot of a UAV located at a ground station. However, communications are not intended to be in any way limited in this regard.

Thus, the Intelligent Communications Management System has access to a wealth of information, such as mission environment and internal state of the node, and uses this information in its decision making. The environment represents the systems knowledge about the outside world, including network and link performance, other nodes in the network environment, dynamic threats, terrain, obstacles and weather data. The internal state is a representation of the internals of the system. It collects internal data from contributing sub-systems, such as real-time node attitude and position, current operational mode and applications' communications requirements, and it retains communications/information exchange plans, policies and information about installed resources (e.g. communications links, antennas).

A database (not shown) provides the intelligent communications management module 10 with knowledge about its mission environment and internal state, and uses this information in its decision making. The environmental data represents the system's knowledge about the outside world, including network and link performance, other nodes in the network environment, dynamic threats, terrain, obstacles and weather data. The internal state is a representation of the internal sub-systems of the system. The database collects internal data from contributing sub-systems, such as real-time node attitude and position, current operational mode and the communications requirements of individual applications, and it retains communications/information exchange plans, policies and information about installed resources (e.g. communication systems, antennas, etc). For example, the antenna gain patterns for each installed antenna on a node would be stored on each node, in a database for example, to be used by the intelligent communications management module 10 in respect of, for example, antenna selection. In this example, the antenna gain patterns are mapped with respect to the body reference frame of the node, i.e. location of the antenna on the node.

It will be appreciated that the term "database" used above, is used simply to define one or more repositories for the required data. In one exemplary embodiment, the database may be a single repository, provided on platform to be accessed by the intelligent management module 10 (or at least dedicated thereto) and other functional components/sub-systems in which all of the aforementioned data is stored for use thereby. In other exemplary embodiments, such a single repository may be used to store only a sub-set of the data, such as policies and installed antenna performance, to be accessed as required, with data that changes dynamically during a flight or mission, such as node position and operational mode, being sent directly from a relevant part of the overall platform management system to the intelligent communications management module.

Also illustrated in FIG. 1, are data inputs representative of constraints 24, platform demands, and policy 28. These factors and the manner in which data representative thereof can be obtained will be known to a person skilled in the art. The policy 28, for example, may be designed by the network designer. A copy of this policy may reside within the intelligent management module 10, or accessible thereby. The policy contains a set of rules that, for example, define how communications links/radios and antennas can be used, what action to take in the event of a hardware fault and/or loss of signal, and how avionics applications can be served to support the mission. Such rules may be expressed as condition-action pairs (i.e. IF condition THEN action) and/or in look-up tables.

Figure 2:
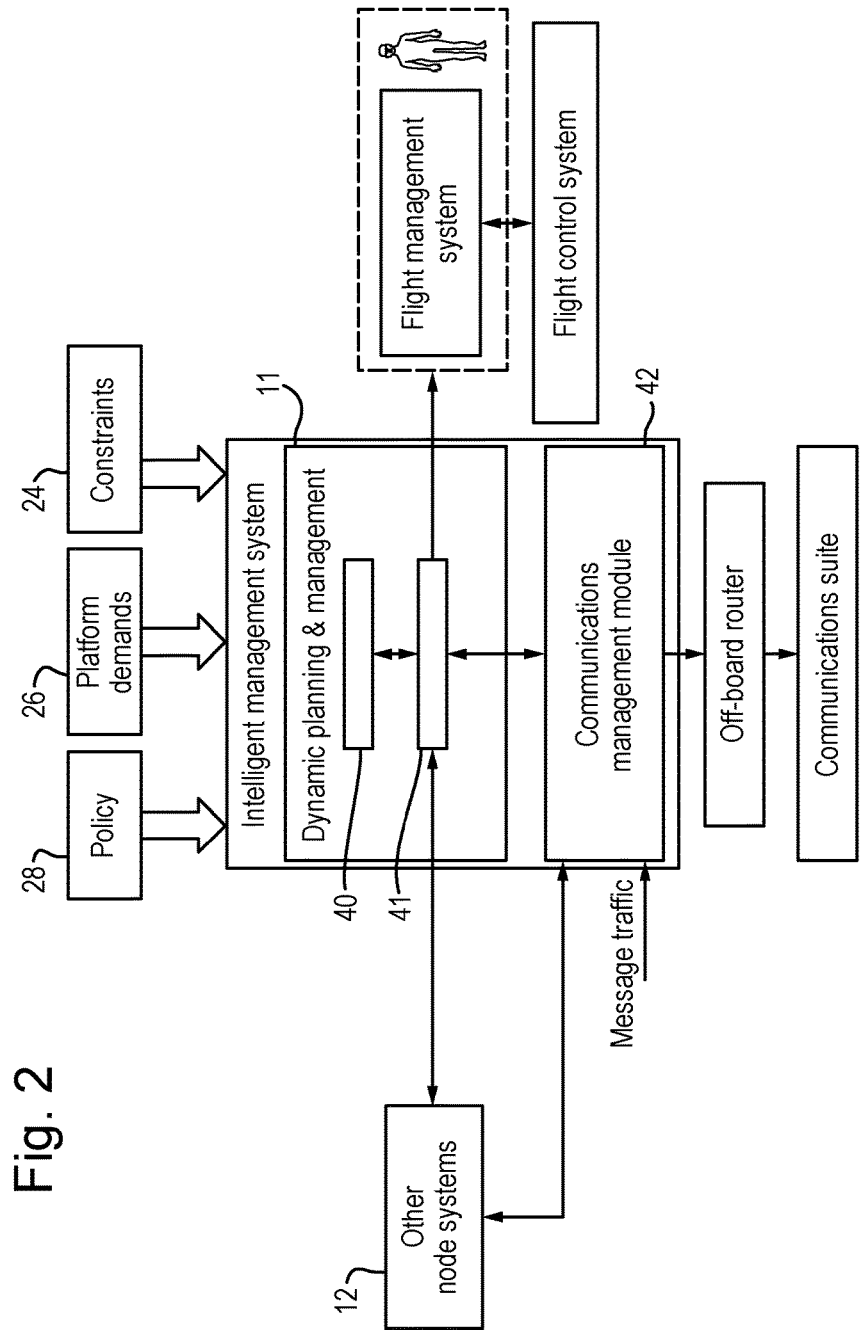
FIG. 2 is a schematic block diagram illustrating some principal features of the moving platform system of FIG. 1 in more detail.

Referring now to FIG. 2 of the drawings, the intelligent management module 10 comprises a dynamic planning and management module 11 and a communications management system 42. The communications management system 42 is concerned with low-level decision making. When it is unable to resolve certain communications issues, it may be configured to generate a request for the dynamic planning and management module 11 to modify plans in order to meet platform demands (i.e. higher-level planning).

In the example shown, the dynamic planning and management module 11 comprises a dynamic planner 40 and a manager 41, that provides an interface between the dynamic planner 40 and the communications management system 42, as will be described in more detail below.

Communications systems are known and used in many different applications. In exemplary embodiments of the present invention, the intelligent communications management system 10 works cooperatively with the rest of the platform's systems/subsystems to achieve the mission goal: to provide information for situational awareness and safety purposes, and to receive information used in its decision making. In other words, at least parts of the node system 12 are communicably coupled to the communications management system 42 and the dynamic planning and management module 11.

The communications management module 42 monitors and evaluates current network performance, so it is network-aware, thereby enabling it to provide comprehensive communications information for use during a mission with a view to enabling adequate connectivity to be maintained throughout.

Referring back to FIG. 2 of the drawings, dynamic planners are also widely known and used in many different applications. A dynamic planner is typically provided in respect of, for example, a UAV for planning its route/path, from a start point (typically, but not always) to a defined end point (and optionally including any defined waypoints therebetween), as well as planning its manoeuvre and/or trajectory. Known dynamic planners (path, manoeuvre and trajectory) tend to base their calculation on several factors, such as terrain, threat, weather, and platform constraints. For example, a manoeuvre may be calculated to avoid an airborne obstacle or a path calculated to avoid detection of the UAV. Other types of dynamic planners for route planning in many different applications will be known to a person skilled in the art and the present invention is not necessarily intended to be limited in this regard.

However, in prior art systems, no provision is made for assessment of future connectivity in the event of such an unplanned manoeuvre or change in route. Thus, an unexpected manoeuvre can cause loss of communications between the platform and a recipient node, which can lead to loss of situational awareness for the pilot at the control station, or failure to receive information at the platform. Ideally, it is desired that communications between the platform and the pilot, as well as between the platform and other platforms, is maintained regardless of the manoeuvre/orientation of the aircraft.

In contrast, in this exemplary embodiment of the present invention, apparatus is provided (for example but not necessarily, in the communications management system 42) which receives data from other parts of the vehicle and/or from communications links/radio, and enables the above-mentioned connectivity map(s) to be generated, for use by the dynamic route planner and/or manoeuvre planner with a view to maintaining adequate communications when an unplanned event occurs.

Figure 3:
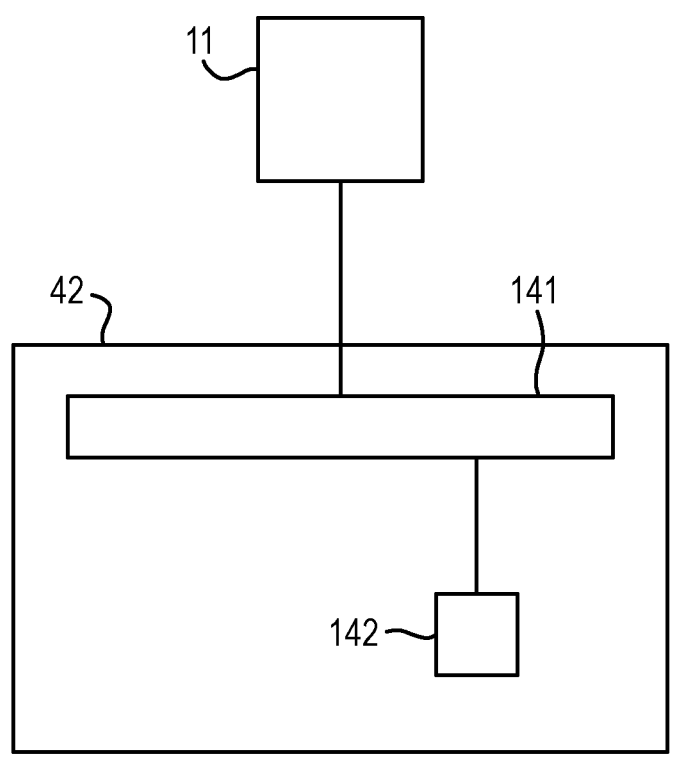
FIG. 3 is a schematic block diagram illustrating a communications management system including apparatus according to an exemplary embodiment of the present invention.

Referring to FIG. 3 of the drawings, in one exemplary embodiment of the invention, a Communications Executive function 141 or other type of interface function is provided within the communications management system 42 to enable it to interface with components internal and external to the communications management system 42, and particularly in this case with the dynamic route planner 11. Note 11 can also represent a dynamic manoeuvre planner. A connectivity map generating function 142 according to an exemplary embodiment of the present invention is depicted in FIG. 3 as residing within the communications management system 42, with a Communications Executive Function 141 facilitating an interface that enables connectivity map data to be transmitted from the function 142 to the dynamic route or manoeuvre planner 11. However, in other exemplary embodiments, the connectivity map generation function may reside within the communications management system 42 and be configured to transmit the connectivity map data to a database (not shown), without the aid of the Communications Executive 141, for selective access by the dynamic route or manoeuvre planner 11, as required. In yet another exemplary embodiments, the connectivity map generation function may reside elsewhere on the platform, and be configured to transmit connectivity map data to a database (not shown) for selective access by the dynamic route or manoeuvre planner 11, as required.

Thus, and as mentioned above, the proposed approach involves the generation of a connectivity metric as a function of a future predicted heading and a range of banking angles the airborne vehicle is capable of achieving. The metric calculation considers mission environment, antenna mount (i.e. location of antenna on node) and pointing of the antenna, and future predicted node trajectory, attitude and location for source and recipient. In one exemplary implementation, as explained above, the connectivity metric is provided directly to the dynamic route or manoeuvre planner, for use thereby. In alternative exemplary implementations, the connectivity metric may be stored within a database for retrieval and use by the dynamic planner, as required.

A method and system according to an exemplary embodiment of the present invention will now be described, for generating a connectivity map for a mobile platform and providing the connectivity map to an on-board dynamic planner. It will be appreciated that the resultant connectivity map can be provided directly to the dynamic route or manoeuvre planner, on request or otherwise, via the Communications Executive Function 141 or other interface function. However, in other exemplary embodiments, the connectivity map may be stored in a database for access by the dynamic route or manoeuvre planner as required, and the present invention is not necessarily intended to be limited in this regard.

To derive a connectivity map, the communications links need to be assessed in terms of their ability to maintain communications for transmission and/or reception of messages. In one embodiment, the connectivity map may jointly represent both the ability to transmit and receive, whilst in another embodiment it may represent the information for each separately.

The following describes a method for determining the connectivity map in terms of transmission. Equally, this method can also be applied when determining the connectivity map in terms of reception (i.e. evaluating each receiver as a function of a future predicted heading and range of banking angles).

The method proposed herein evaluates each transmitter as a function of a future predicted heading and the above-mentioned range of banking angles. The calculation is based on estimated and measured link performance, mission environment, aircraft performance, antenna performance and future predicted attributes, such as trajectory, attitude and position, for both the source and recipient. The Connectivity Metric is then calculated based on the Transmitter Metric. In one implementation, a jointly optimised Connectivity Metric as a function of heading and banking angle is calculated. For example, when considering more than one message, route plan message and image, a combined metric for route plan and image messages is calculated. The Connectivity Metric can be pushed to the dynamic route or manoeuvre planner. Or in another implementation, it can be stored within a database and pulled by the dynamic planner when required.

Figure 5:
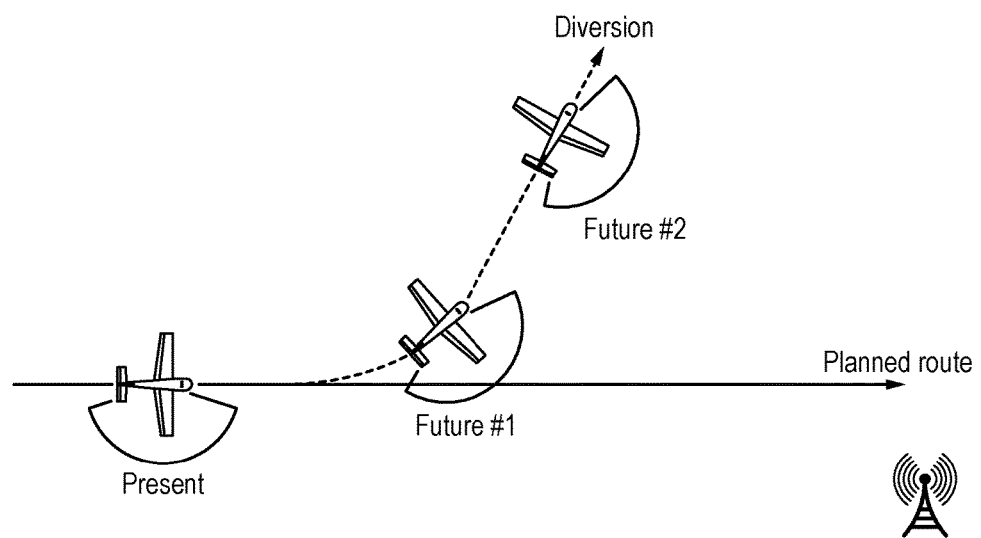
FIG. 5 is a schematic illustration of an aircraft trajectory for a given heading.

Node trajectory is made up of several segments and the 'goodness' of the transmitter for a given segment is determined. A trajectory can be made up of a present segment and one or more predicted future segments. Hence, the Transmitter Metric calculation takes into account present segment calculations and predicted future segment calculations. As an example, suppose there are three segments: one in the present and two in the future, for a given heading, as depicted schematically in FIG. 5 of the drawings. For each of the three segments, the quality of the link is estimated with respect to the recipient and the overall 'goodness' of each transmitter determined. Equally, when assessing the reception at the platform, for each of the three segments, the quality of the link is estimated with respect to the other node (e.g. source) and the overall 'goodness' of each receiver determined.

FIG. 6 of the drawings is a flowchart illustrating an exemplary method for generating a Connectivity Metric as a function of a future heading. The method considers multiple factors when determining the Connectivity Metric, such as the mission environment (e.g. obstacles, terrain, and interference), installed communication links and antennas.

The method starts at step 700 by determining a minimum set of messages, which need to be serviced. This step of the method takes into account that it may not be possible to provide a service for all messages during a sense and avoid manoeuvre, for example, whereas exchange of critical messages, or a minimum set of messages, such as C2 (Command and Control), may be important to maintain situational awareness with the pilot. A message set can be defined in terms of Message Group, Message Class, or a subset of messages from a Message Class, i.e. Message Types.

A set of messages can be based on one or more message group/class/type. Messages may also be categorised in terms of common performance requirements, in terms of latency and bandwidth, for example. The serviceable messages can be dynamically determined during mission-execution based on Operational Mode and/or by the system designer at the pre-mission phase. Operational Mode represents what the platform is trying to achieve, such as: normal operation, reconnaissance, under attack, taxiing, landing, etc.

The method proceeds by determining the suitability of the communications resources (e.g. transmitter and/or antenna) in terms of preference, availability and/or compatibility for the set of the messages identified in the previous step. In another implementation, this step determines suitable antenna and transmitter combinations, e.g. for multiple antenna or shared aperture antenna implementations. It will be apparent to a person skilled in the art, that part of a wireless communications link comprises a radio transmitter and an antenna.

The method proceeds at step 702 by determining the goodness of a transmitter for a given predicted heading and banking angle. A metric is calculated to determine the goodness of a transmitter. This step considers mission environment, antenna mount (i.e. location of antenna on node) and pointing of the antenna, and future predicted node trajectory, attitude and location for source and recipient. The calculation of the Transmitter Metric takes into account present heading calculations and predicted future heading calculations.

The method proceeds at step 704 by determining the Connectivity Metric as a function of heading and banking angle. The Connectivity Metric is based on the calculated Transmitter Metric from the previous step. In one implementation, a jointly optimised Connectivity Metric as a function of heading and banking angle is calculated. For example, when considering more than one message group/class/type, a combined metric is calculated.

FIG. 7 is a flowchart illustrating a method for analysing the 'goodness' of a transmitter (including associated antenna) for a given predicted heading and banking angle. The method calculates a Transmitter Metric to determine how good the transmitter would be for a given message set.

The method starts, at step 800, by selecting the next heading for a given message set and banking angle.

The method proceeds, at step 802, by determining the Transmitter Availability and Transmitter Preference. Transmitter Availability and Transmitter Preference may be specified by the system designer and/or based on performance indicators and platform demand, during mission execution. Transmitter Availability and Transmitter Preference may be set to a binary 0 and 1. For example, a transmitter may not be available due to communications equipment failure, so the Transmitter Availability may be assigned a 0-value, whereas a link may not be preferred due to emissions control restrictions or due to a conflict with another user in the operation environment, for example, so the Transmitter Preference may be assigned a 0-value. These values can be stored in a look-up table within the database and accessed when required. This step may also assess the associated antenna by determining the antenna availability and/or antenna preference and/or antenna compatibility.

The method proceeds, at step 804, by determining the quality of the link for a given segment. The link performance for each transmitter is based on estimated and sensed link performance, mission environment, antenna performance, current attributes and future predicted attributes, such as trajectory, attitude and position, for both the source and recipient.

The method proceeds, at step 806, by determining the overall 'goodness' of the transmitter along the trajectory for a given heading and banking angle. This step considers present segment calculations and predicted future segment calculations, obtained from the previous step, and calculates a Transmitter Metric. The Transmitter Metric may be calculated by multiplying Transmitter Availability, Transmitter Preference and Link Quality. The Transmitter Metric may also be calculated by multiplying Transmitter Availability, Transmitter Preference, antenna availability and/or antenna preference and/or antenna compatibility and Link Quality. It may have a value in the range of 0 and 1, where 0 represents a bad transmitter and 1 represents a good transmitter.

Once the Transmitter Metric is calculated, the Connectivity Function (shown in FIG. 7) determines the Connectivity Metric for a given heading and banking angle. The Connectivity Metric for a given heading may have a value equal to the Transmitter Metric, i.e. $C(\Psi, \phi) = T(\Psi, \phi)$, where $\Psi$ and $\phi$ are heading and banking angle respectively. The Connectivity Metric may be defined as a binary code, for example 0 (bad) and 1 (good). The Connectivity Metric can be stored in look-up tables, which is then accessed by the dynamic planner, or it can be provided to the dynamic planner wrapped in a message. Furthermore, the dynamic planner may be either transmitter-aware, i.e. which transmitter can provide the best connectivity, or not transmitter-aware.

In one exemplary implementation, the Connectivity Metric for a given heading and banking angle may be calculated as the sum of the individual Transmitter Metrics for a given heading, i.e. $C(\Psi, \varnothing) = \Sigma_{i=1}^{N} T_i(\Psi, \varnothing)$, the reason for which will be explained. The individual transmitters may have metrics that are less than ideal, i.e. each transmitter alone cannot support the required bandwidths for the set of messages. However collectively, the transmitters can meet the required bandwidth requirement. For example, a node may have the capability to dynamically route some of the message flows via one transmitter and other message flows via another transmitter. Hence, the Connectivity Metric represents the collective of the individual transmitter metrics for a given heading.

In one exemplary implementation, a single Connectivity Metric for a given heading and banking angle is determined for each message set. The Connectivity Metric can be based on the best transmitter from a plurality of transmitters. In other words, the Connectivity Metric may have a value equal to the metric of the best transmitter, as shown in equation (1.1). For example, for C2 and 45° heading, the best transmitter is SATCOM with a metric=1. Hence, for C2 and 45° heading, the Connectivity Metric=1.

$$C(\Psi, \varnothing) = \max(T_1, T_2, \ldots T_N) \quad (1.1)$$

where $T_N$ is the Transmitter Metric for each transmitter.

In one implementation, a connectivity metric for each of transmitter and receiver as a function of heading and banking angle can be determined for each message set. In yet another implementation, a joint connectivity metric for transmitting and receiving as a function of heading and banking angle can be determined.

In another exemplary implementation, more than one Connectivity Metric for a given heading and banking angle can be determined for each message set. The metrics can be based on the best two transmitters. As an example, for C2 Message Group, there are two Connectivity Metrics for a given heading and banking angle: one metric is associated with the C2 transmitter and the other metric is for the SATCOM transmitter. Both Connectivity Metrics are made available to the dynamic planner.

In another exemplary implementation, a jointly optimised Connectivity Metric as a function of heading and banking angle can be determined. When considering more than one message set, a combined metric for the different message sets can be calculated, for a given heading and banking angle. In other words, the joint metric represents the combined benefit of each of the message sets as a function of heading and banking angle. A jointly optimised Connectivity Metric can be calculated based on a weighted sum of the Connectivity Metrics for each message set, as shown in equation (1.2). The weight factors can be set by the system designer to achieve the desired correct results. The sum of the individual weight factors can have a value of 1, so each individual weight factor has a value between 0 and 1. As an example, the individual Connectivity Metrics can be derived from equation (1.1).

The joint optimised Connectivity metric is: Equ. (1.2)

$$I(\Psi, \phi) = \sum_{i=1}^{N} W_i C_i(\Psi, \phi)$$

where $W_i$ is the individual weight factor.

It will be apparent to a person skilled in the art, from the foregoing description, that modifications and variations can be made to the described embodiments without departing from the scope of the present invention as defined by the appended claims.

What is claimed is:

1. Apparatus for generating a connectivity map in respect of a communications system of a moving platform, said communications system comprising at least one platform application and being configured to effect wireless data communication between said platform and another node by means of one of a plurality of supported communications links in accordance with a communications plan, wherein said apparatus is configured to: identify a message or set of messages required to be transmitted from or received by said moving platform; and generate a connectivity map comprising a plurality of connectivity metrics by, for each of a plurality of different specified attitudes or orientations derived from one or more predicted trajectories of said moving platform: identifying available transmitters for wireless transmission of said message or set of messages and/or identify available receivers for wireless reception of said message or set of messages; for each identified transmitter, determining a transmitter metric and/or for each identified receiver, determining a receiver metric; defining a connectivity metric, based on said transmitter metrics and/or receiver metrics for said respective specified attitude or orientation, said connectivity metric being representative of a quality of a respective associated communications link for effecting transmission or reception by said platform of said message or set of messages in respect of said respective specified attitude or orientation of said moving platform; and a management system for a moving platform comprising a plurality of systems and at least one platform application, a dynamic route planner configured to generate a new heading plan in respect of said moving platform, a platform application and being configured to effect wireless data communication supported communications links in accordance with a communications plan, wherein said dynamic route planner or said dynamic obstacle avoidance planner is configured to use said connectivity map to generate a route plan or heading plan including an attitude/orientation of said moving platform corresponding to a selected connectivity metric.

2. The apparatus according to claim 1, wherein said moving platform comprises an airborne vehicle, and said specified attitude or orientation comprises a specified heading and/or banking angle of said airborne vehicle.

3. The apparatus according to claim 1, configured to calculate, in respect of each identified transmitter, said transmitter metric for at least a portion of said predicted trajectory of said moving platform by:
obtaining a transmitter preference value and a transmitter availability value;
estimating a link quality or obtaining a measured link quality of the respective associated communications link using data obtained from one or more systems/subsystems of said moving platform; and
calculating said transmitter metric using said transmitter preference, transmitter availability and estimated and/or measured link quality values.

4. The apparatus according to claim 1, configured to calculate, in respect of each identified receiver, said receiver metric for at least a portion of said predicted trajectory of said moving platform by:
obtaining a receiver preference value and a transmitter availability value;
estimating a link quality or obtaining a measured link quality of the respective associated communications link using data obtained from one or more systems/subsystems of said moving platform; and
calculating said receiver metric using said receiver preference, transmitter availability and estimated and/or measured link quality values.

5. The apparatus according to claim 1, wherein, for each of said specified attitudes or orientations, a transmitter metric or receiver metric is calculated in respect of each of a plurality of portions of at least one predicted trajectory of said moving platform.

6. The apparatus according to claim 5, wherein each said connectivity metric for a communications link is defined using said respective transmitter metrics or receiver metrics determined for said plurality of portions of said predicted trajectory in respect thereof.

7. The apparatus according to claim 1, wherein said connectivity metric for a communications link is equal to said respective transmitter/receiver metric, or a sum of a plurality of respective transmitter/receiver metrics, determined for a predicted trajectory of said moving platform.

8. The apparatus according to claim 1, wherein said connectivity metric for a communications link is defined as a binary value, integer values or non-integer values indicative of a quality of the respective communications link for transmitting/receiving said message or set of messages in respect of a specified attitude or orientation of said moving platform.

9. The apparatus according to claim 1, configured to identify a communications link having a highest transmitter/receiver metric, and define said connectivity metric based on said identified communications link.

10. The apparatus according to claim 1, configured to identify, for a specified attitude or orientation of said moving platform, more than one communications link having the best transmitter/receiver metrics, and define a plurality of said connectivity metrics based on each said communications link.

11. The apparatus according to claim 1, wherein a jointly optimised connectivity metric is calculated for a plurality of messages or message sets.

12. The apparatus according to claim 1, configured to:
identify a plurality of messages or sets of messages required to be transmitted from or received by said moving platform; and
generate a connectivity map comprising a plurality of connectivity metrics by, for each of a plurality of different specified attitudes or orientations derived from one or more predicted trajectories of said moving platform:
identifying available transmitters for wireless transmission of said plurality of messages or sets of messages and/or identify available receivers for wireless reception of said plurality of messages or sets of messages;

for each identified transmitter, determining a transmitter metric and/or for each identified receiver, determining a receiver metric; and for all of said plurality of messages or sets of messages, defining a combined connectivity metric, based on said transmitter metrics and/or receiver metrics for said respective specified attitude or orientation, said combined connectivity metric being representative of a quality of a respective associated communications link for effecting transmission or reception by said platform of said plurality of messages or sets of messages in respect of said respective specified attitude or orientation of said moving platform.

13. The apparatus according to claim 1, configured to cause said connectivity map to be stored and/or transmitted to a dynamic route planner or dynamic obstacle avoidance planner of said moving platform.

14. A method for generating connectivity data in respect of a communications system of a moving platform, said communications system comprising at least one platform application and being configured to effect wireless data communication between said platform and another node by means of one of a plurality of supported communications links in accordance with a communications plan, wherein said method comprises: identifying a message or set of messages required to be transmitted from or received by said moving platform; and generating a connectivity map comprising a plurality of connectivity metrics by, for each of a plurality of different specified attitudes or orientations derived from one or more predicted trajectories of said moving platform: identifying available transmitters for wireless transmission of said message or set of messages and/or identify available receivers for wireless reception of said message or set of messages; for each identified transmitter, determining a transmitter metric and/or for each identified receiver, determining a receiver metric; defining a connectivity metric, based on said transmitter metrics and/or receiver metrics for said respective specified attitude or orientation, said connectivity metric being representative of a quality of a respective associated communications link for effecting transmission or reception by said platform of said message or set of messages in respect of said respective specified attitude or orientation of said moving platform; and generating a route plan or a new heading plan in respect of said moving platform, the communications system configured to effect wireless data communication between said platform and another node by means of one of a plurality of supported communications links in accordance with a communications plan, and using said connectivity map to generate a route plan or heading plan including an attitude orientation of said moving platform corresponding to a selected connectivity metric.

* * * * *